US011877968B1

(12) United States Patent
Roberts

(10) Patent No.: US 11,877,968 B1
(45) Date of Patent: Jan. 23, 2024

(54) EXTENDABLE SAFETY HANDLE FOR BENCHES

(71) Applicant: Marilyn Roberts, Newnan, GA (US)

(72) Inventor: Marilyn Roberts, Newnan, GA (US)

( * ) Notice: Subject to any disclaimer, the term of this patent is extended or adjusted under 35 U.S.C. 154(b) by 51 days.

(21) Appl. No.: 17/729,215

(22) Filed: Apr. 26, 2022

(51) Int. Cl.

| | |
|---|---|
| ***A61G 7/10*** | (2006.01) |
| ***B25H 1/00*** | (2006.01) |
| ***A61G 13/00*** | (2006.01) |
| ***A61G 13/10*** | (2006.01) |

(52) U.S. Cl.
CPC ......... *A61G 7/1001* (2013.01); *A61G 7/1038* (2013.01); *A61G 7/1073* (2013.01); *A61G 13/0018* (2013.01); *A61G 13/10* (2013.01); *B25H 1/00* (2013.01)

(58) Field of Classification Search
CPC .. A61G 7/1001; A61G 7/1038; A61G 7/1073; A61G 13/0018; A61G 13/10; B25H 1/00
See application file for complete search history.

(56) References Cited

U.S. PATENT DOCUMENTS

| | | | | |
|---|---|---|---|---|
| 1,778,698 | A * | 10/1930 | Walter | A61G 13/0009 5/602 |
| 4,932,090 | A * | 6/1990 | Johansson | A61G 7/053 5/662 |
| 5,337,430 | A * | 8/1994 | Schlein | A47C 21/00 5/662 |
| 6,050,644 | A | 4/2000 | Neal | |
| 6,544,154 | B2 | 4/2003 | Forcillo | |
| 7,032,265 | B2 * | 4/2006 | Miller | A47C 21/00 5/81.1 R |
| 7,039,971 | B2 * | 5/2006 | Sebastien | A61G 7/053 5/430 |
| 7,303,513 | B1 | 12/2007 | Curtiss | |
| 7,805,789 | B1 * | 10/2010 | Dean | A47C 21/08 5/646 |
| 8,371,597 | B2 | 2/2013 | DeCrescenzo | |
| 8,756,735 | B2 | 6/2014 | Heimbrock | |
| 9,265,677 | B2 | 2/2016 | Manoucheehri | |
| 10,272,005 | B2 * | 4/2019 | Heidingsfelder-Bongard | A47C 21/00 |
| D886,562 | S | 6/2020 | Mizelle | |

(Continued)

FOREIGN PATENT DOCUMENTS

| | | |
|---|---|---|
| WO | 0035320 | 6/2000 |

*Primary Examiner* — Anita M King
(74) *Attorney, Agent, or Firm* — Kyle A. Fletcher, Esq.

(57) ABSTRACT

The extendable safety handle for benches is a safety device. The extendable safety handle for benches is a mobility assistance device. The extendable safety handle for benches is configured for use with the bench. The extendable safety handle for benches attaches to the bench. The extendable safety handle for benches rotates between a collapsed position and a deployed position. The extendable safety handle for benches forms a mobility assistance device when deployed. The extendable safety handle for benches rotates and collapses into a collapsed position. The extendable safety handle for benches comprises a pedestal structure and a telescopic stanchion. The pedestal structure attaches the telescopic stanchion to the bench. The telescopic stanchion rotates relative to the pedestal structure. The telescopic stanchion rotates between the deployed position and the collapsed position.

15 Claims, 5 Drawing Sheets

(56) References Cited

U.S. PATENT DOCUMENTS

| | | | | |
|---|---|---|---|---|
| 2006/0230540 | A1 * | 10/2006 | Whelan | A61G 7/053<br>5/662 |
| 2009/0294214 | A1 | 12/2009 | Vosbikian | |
| 2013/0326845 | A1 * | 12/2013 | Hinkle | A61H 3/00<br>16/429 |

* cited by examiner

EXTENDABLE SAFETY HANDLE FOR BENCHES

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of aids for getting on and off of a work bench.

SUMMARY OF INVENTION

The extendable safety handle for benches is a safety device. The extendable safety handle for benches is a mobility assistance device. The extendable safety handle for benches is configured for use with a work bench. The extendable safety handle for benches attaches to the bench. The extendable safety handle for benches rotates between a collapsed position and a deployed position. The extendable safety handle for benches forms a mobility assistance device when deployed. The extendable safety handle for benches rotates and collapses into a collapsed position. The extendable safety handle for benches comprises a pedestal structure and a telescopic stanchion. The pedestal structure attaches the telescopic stanchion to the bench. The telescopic stanchion rotates relative to the pedestal structure. The telescopic stanchion rotates between the deployed position and the collapsed position.

These together with additional objects, features and advantages of the extendable safety handle for benches will be readily apparent to those of ordinary skill in the art upon reading the following detailed description of the presently preferred, but nonetheless illustrative, embodiments when taken in conjunction with the accompanying drawings.

In this respect, before explaining the current embodiments of the extendable safety handle for benches in detail, it is to be understood that the extendable safety handle for benches is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the extendable safety handle for benches.

It is therefore important that the claims be regarded as including such equivalent construction insofar as they do not depart from the spirit and scope of the extendable safety handle for benches. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
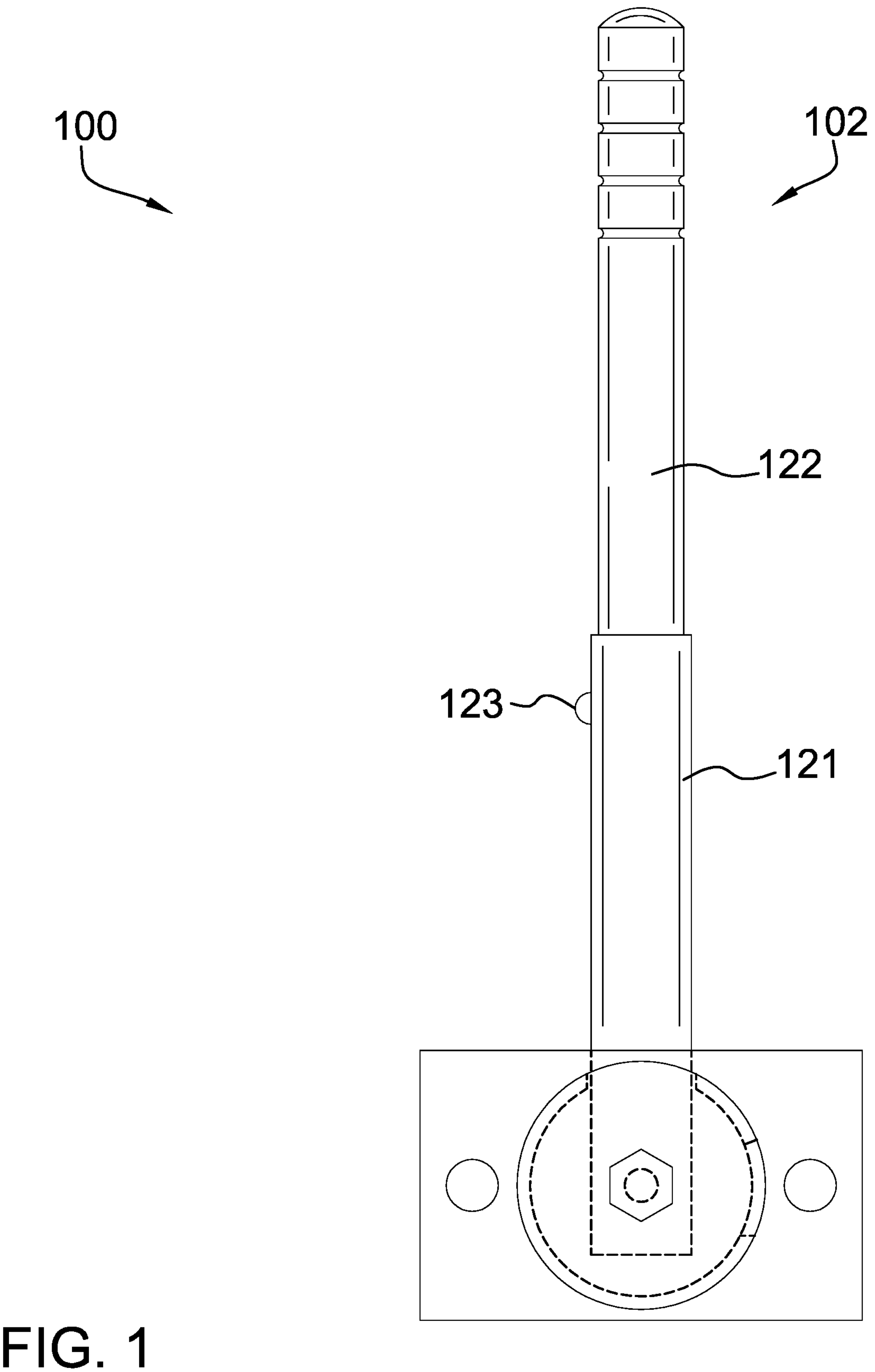
FIG. 1 is a front view of an embodiment of the disclosure.
Figure 2:
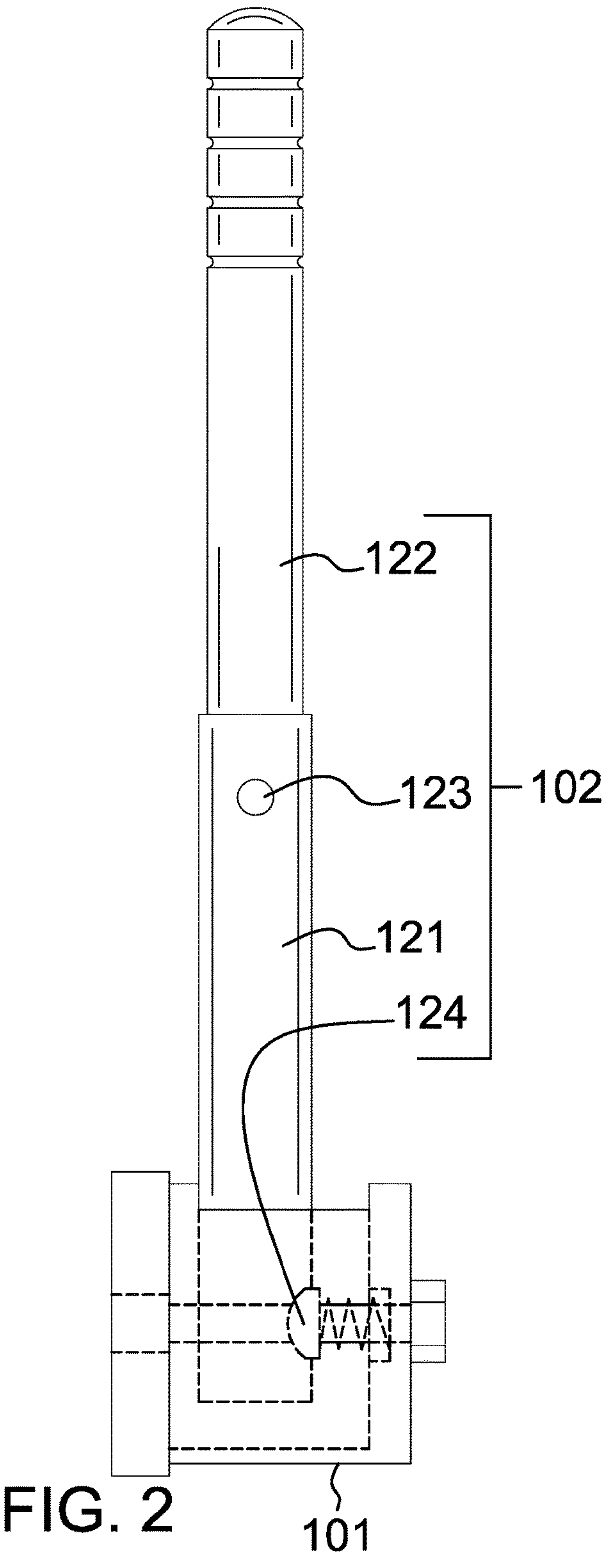
FIG. 2 is a side view of an embodiment of the disclosure.
Figure 3:
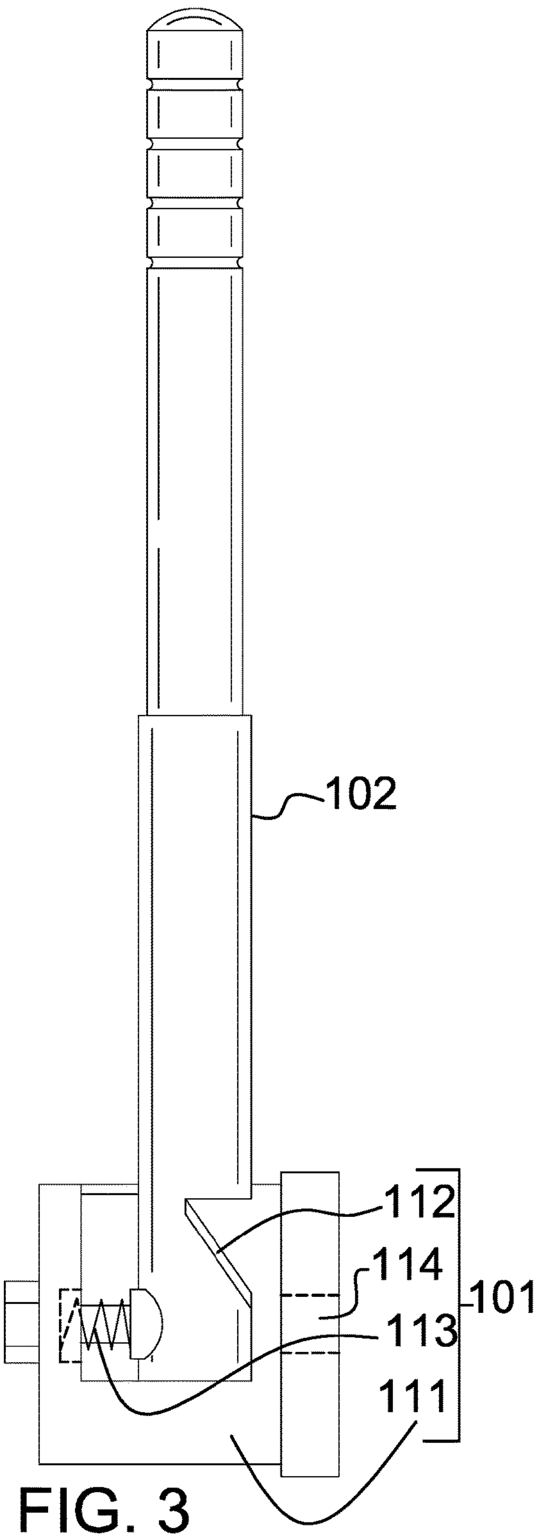
FIG. 3 is a side view of an embodiment of the disclosure.
Figure 4:
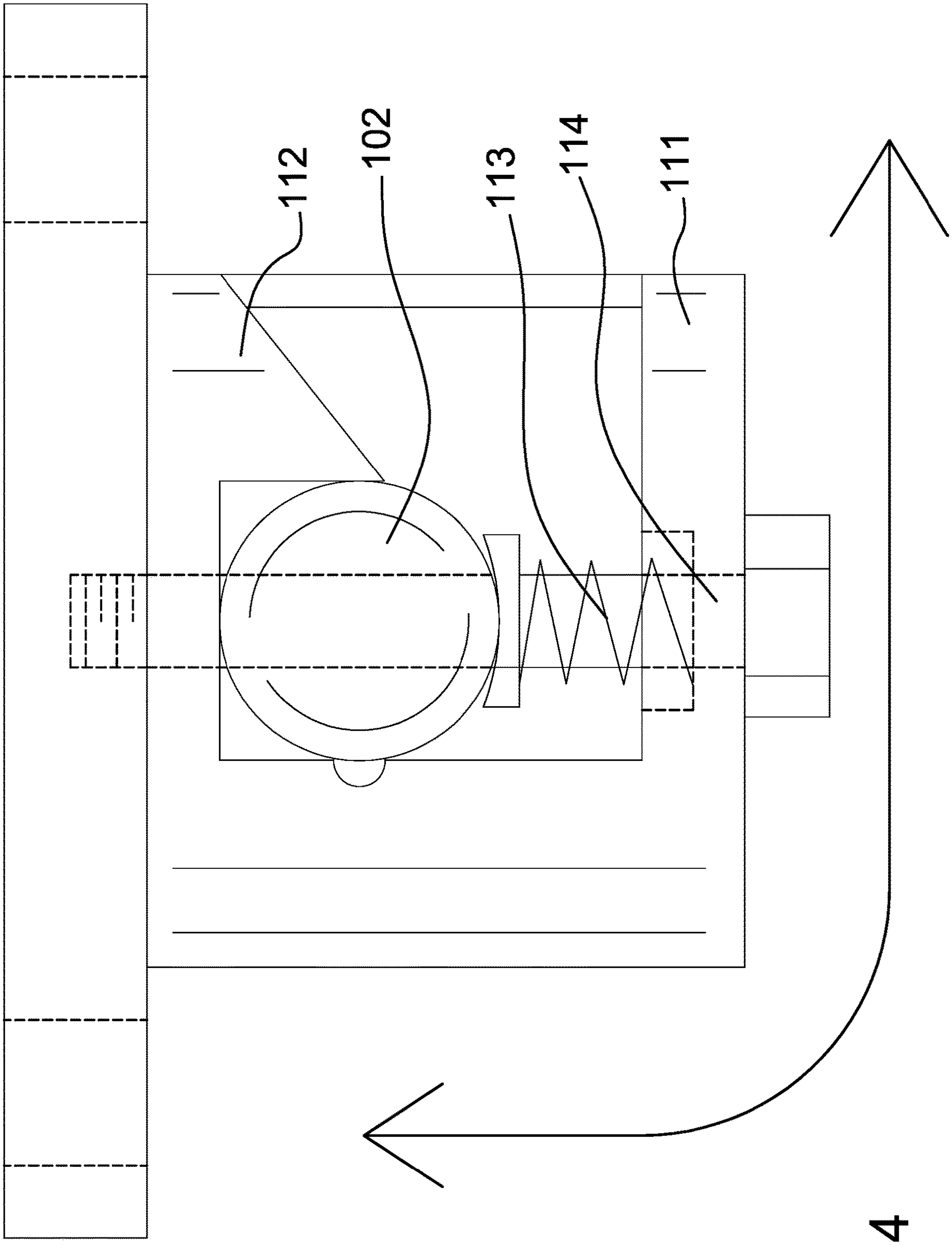
FIG. 4 is a top view of an embodiment of the disclosure.
Figure 5:
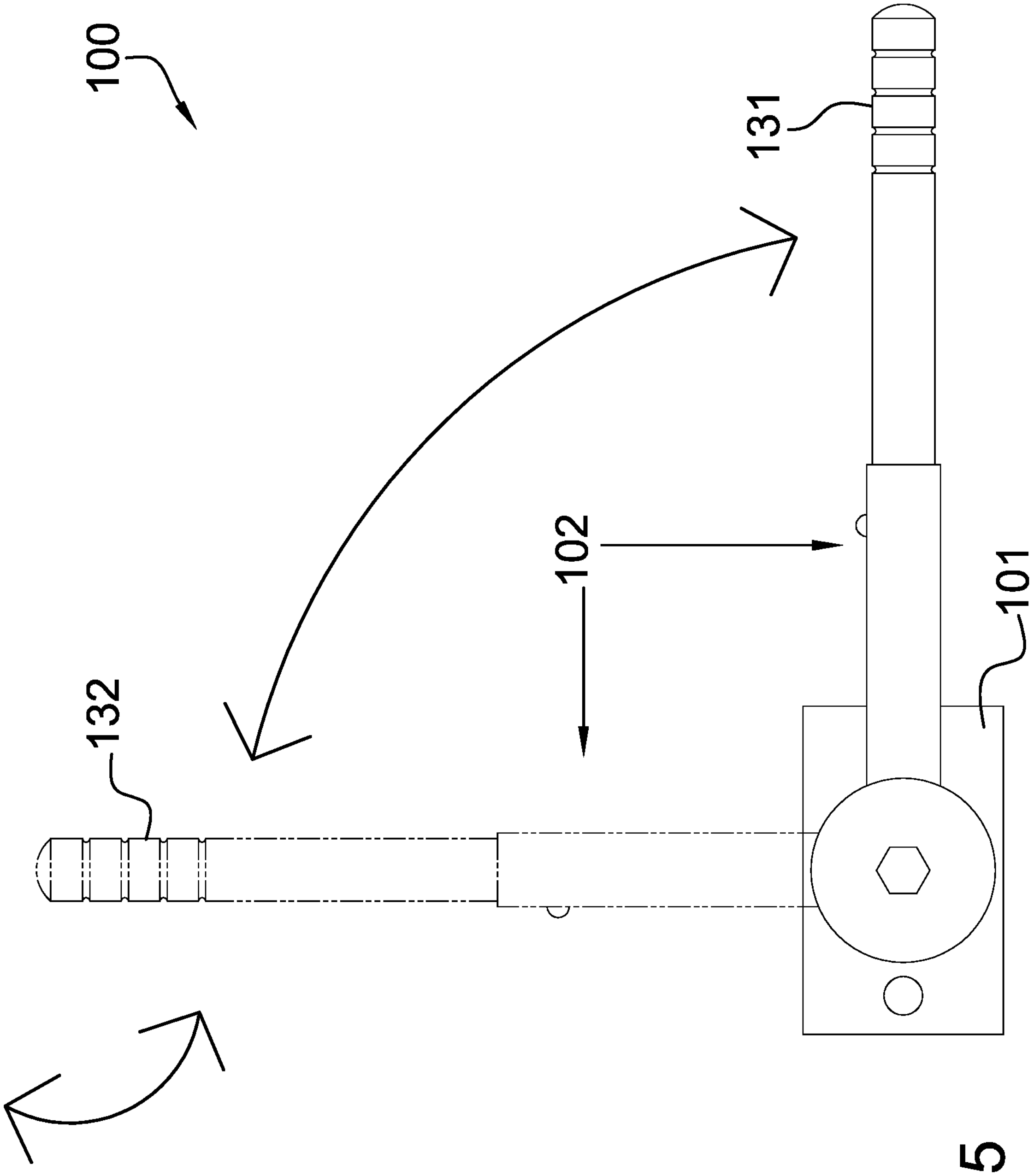
FIG. 5 is an in-use view of an embodiment of the disclosure.
Figure 6:
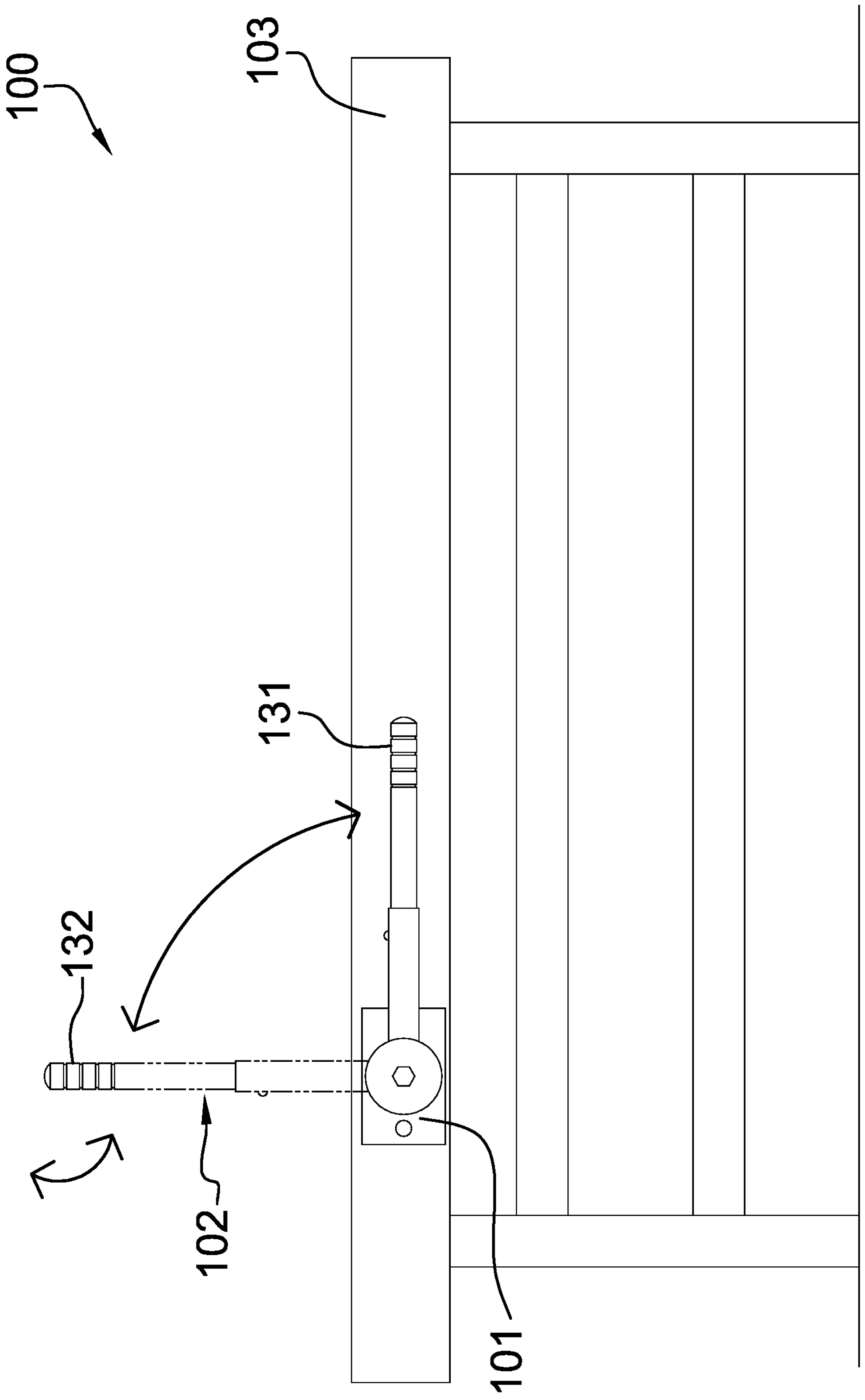
FIG. 6 is an in-use view of an embodiment of the disclosure.

Detailed reference will now be made to one or more potential embodiments of the disclosure, which are illustrated in FIGS. 1 through 6.

The extendable safety handle for benches 100 (hereinafter invention) is a safety device. The invention 100 is a mobility assistance device. The invention 100 is configured for use with the work bench 103. It shall be noted that the word bench 103 may be referred to as a work bench 103, and vice versa. The bench 103 is a horizontally oriented platform. The bench 103 forms a surface on which a patient stands. The bench 103 is defined elsewhere in this disclosure. The invention 100 attaches to the bench 103. The invention 100 rotates between a collapsed position 131 and a deployed position 132. The invention 100 forms a mobility assistance device when deployed. The invention 100 rotates and collapses into a collapsed position 131. The invention 100 comprises a pedestal structure 101 and a telescopic stanchion 102. The pedestal structure 101 attaches the telescopic stanchion 102 to the bench 103. The telescopic stanchion 102 rotates relative to the pedestal structure 101. The telescopic stanchion 102 rotates between the deployed position 132 and the collapsed position 131.

The pedestal structure 101 is a mechanical structure. The pedestal structure 101 attaches the telescopic stanchion 102 to the bench 103. The pedestal structure 101 forms the load path that transfers the loads borne by the telescopic stanchion 102 to the bench 103. The pedestal structure 101 comprises a u-shaped structure 111, a locking stop 112, a compression spring 113, and a locking hinge 114.

The u-shaped structure 111 is a mechanical structure. The u-shaped structure 111 is a rigid structure. The u-shaped structure 111 attaches to the bench 103. The u-shaped structure 111 forms the final link in the load path that transfers the load borne by the invention 100 to the bench 103. The u-shaped structure 111 forms a protection space that encloses the locking stop 112, the compression spring 113, and the locking hinge 114. The telescopic stanchion 102 attaches to the u-shaped structure 111 within the protection space formed by the pedestal structure 101.

The locking hinge 114 is a fastening device. The locking hinge 114 is a rotating structure. The locking hinge 114 attaches the telescopic stanchion 102 to the u-shaped structure 111. The locking hinge 114 attaches the telescopic stanchion 102 to the u-shaped structure 111 such that the telescopic stanchion 102 rotates between the collapsed position 131 and the deployed position 132. The locking hinge 114 is a locking structure. The locking hinge 114 releasably locks the telescopic stanchion 102 in the collapsed position 131. The locking hinge 114 releasably locks the telescopic stanchion 102 in the deployed position 132.

The locking stop 112 is a mechanical structure. The locking stop 112 is a stop motion. The locking stop 112 limits the rotation of the telescopic stanchion 102 such that the telescopic stanchion 102 will not rotate outside of the arc bounded by the collapsed position 131 and the deployed position 132. The locking stop 112 forms a mechanical structure that holds the telescopic stanchion 102 in a set position when the telescopic stanchion 102 rotates into the collapsed position 131. The locking stop 112 forms a mechanical structure that holds the telescopic stanchion 102 in a set position when the telescopic stanchion 102 rotates into the deployed position 132.

The compression spring 113 is a spring. The compression spring 113 is defined elsewhere in this disclosure. The compression spring 113 mounts in the u-shaped structure 111 such that the compression spring 113 is deformed when the telescopic stanchion 102 rotates into the collapsed position 131. The counterforce that returns the compression spring 113 to its relaxed shape presses against the telescopic stanchion 102 such that the compression spring 113 applies a force against the telescopic stanchion 102 that fixes the telescopic stanchion 102 in the collapsed position 131. The compression spring 113 mounts in the u-shaped structure 111 such that the compression spring 113 is deformed when the telescopic stanchion 102 rotates into the deployed position 132. The counterforce that returns the compression spring 113 to its relaxed shape presses against the telescopic stanchion 102 such that the compression spring 113 applies a force against the telescopic stanchion 102 that fixes the telescopic stanchion 102 in the deployed position 132.

The telescopic stanchion 102 is a load bearing structure. The telescopic stanchion 102 transfers the load of a patient to the pedestal structure 101 while the patient preparing to stand on and get off of the bench 103. The telescopic stanchion 102 further transfers the load of a patient to the pedestal structure 101 while the patient preparing to rise up on the bench 103 and come down off the bench 103. The telescopic stanchion 102 attaches to the pedestal structure 101. The telescopic stanchion 102 attaches to the pedestal structure 101 such that the telescopic stanchion 102 rotates relative to the pedestal structure 101. The telescopic stanchion 102 rotates between the collapsed position 131 and the deployed position 132. The pedestal structure 101 releasably locks the telescopic stanchion 102 in the collapsed position 131.

The pedestal structure 101 releasably locks the telescopic stanchion 102 into the deployed position 132. The telescopic stanchion 102 forms a composite prism structure. The span of the length of the center axis of the composite prism structure of the telescopic stanchion 102 is adjustable. The telescopic stanchion 102 is a telescopic structure.

The telescopic stanchion 102 a first arm 121, a second arm 122, and a detent 123. The detent 123 is a mechanical device that locks and secures the first arm 121 to the second arm 122. The first arm 121 is a hollow prism that is further defined with an inner dimension. The second arm 122 is a hollow prism that is further defined with an outer dimension. The second arm 122 is geometrically similar to the first arm 121.

The span of the outer dimension of the second arm 122 is lesser than the span of the inner dimension of the first arm 121 such that the second arm 122 inserts into the first arm 121 in a telescopic fashion to form a composite prism structure. The span of the length of the telescopic stanchion 102 adjusts by adjusting the relative position of the second arm 122 within the first arm 121. The position of the second arm 122 relative to the first arm 121 is held in position using the detent 123.

The telescopic structure 102 further comprises a bushing 124. The bushing 124 is a mechanical structure that secures the compression spring 113 within the protection space formed by the u-shaped structure 111. The bushing 124 maintains the position of the compression spring 113 relative to the telescopic stanchion 102.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Bench: As used in this disclosure, a bench is a horizontal supporting surface formed by a work bench.

Boundary Structure: As used in this disclosure, a boundary structure is a barrier that separates a first object from a second object such that the second object cannot damage the first object.

Bushing: As used in this disclosure, a bushing is a cylindrical aperture through which an object is guided and potentially secured. Bushings are often used as protective linings.

Cant: As used in this disclosure, a cant is an angular deviation from one or more reference lines (or planes) such as a vertical line (or plane) or a horizontal line (or plane).

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Collapsible: As used in this disclosure, the terms collapsible refers to an object that is configured such that the volume of the object is adjustable. By volume is meant the volume of the perimetrical boundary that contains the object. The verbs collapse and retract mean that the volume of the perimetrical boundary of the object changes from a larger volume to a smaller volume. The verbs expand and deploy mean that the volume of the perimetrical boundary of the object changes from a smaller volume to a larger volume. Always use perimetrical boundary Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Compression Spring: As used in this disclosure, a compression spring is a spring that resists forces attempting to compress the spring in the direction of the center axis of the spring. The compression spring will return to its relaxed shape when the compressive force is removed.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Detent: As used in this disclosure, a detent is a device for positioning and holding a first object relative to a second object such that the position of the first object relative to the second object is adjustable.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk.

In this disclosure, the congruent ends of the prism-shaped structure that forms the disk are referred to as the faces of the disk.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Exterior: As used in this disclosure, the exterior is used as a relational term that implies that an object is not contained within the boundary of a structure or a space.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Grip: As used in this disclosure, a grip is an accommodation formed on or within an object that allows the object to be grasped or manipulated by a hand.

Handle: As used in this disclosure, a handle is an object by which a tool, object, or door is held or manipulated with the hand.

Hinge: As used in this disclosure, a hinge is a device that permits the turning, rotating, or pivoting of a first object relative to a second object. A hinge designed to be fixed into a set position after rotation is called a locking hinge. A spring loaded hinge is a hinge formed as an elastic structure. The elastic structure of the spring loaded hinge is deformed under a rotating force such that the elastic structure returns the spring loaded hinge back to its relaxed shape after the rotating force is removed from the spring loaded hinge.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Inferior: As used in this disclosure, the term inferior refers to a directional reference that is parallel to and in the same direction as the force of gravity when an object is positioned or used normally.

Inner Dimension: As used in this disclosure, the term inner dimension describes the span from a first inside or interior surface of a container to a second inside or interior surface of a container. The term is used in much the same way that a plumber would refer to the inner diameter of a pipe.

Interior: As used in this disclosure, the interior is used as a relational term that implies that an object is contained within the boundary of a structure or a space.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Lock: As used in this disclosure, a lock is a releasable fastening device that secures a rotating mechanical device into a fixed position.

Mobility Assistance Device: As used in this disclosure, a mobility assistance device is a mechanical device used to help patients with limited mobility to move.

Mount: As used in this disclosure, a mount is a mechanical structure that attaches or incorporates an object into a load path.

Negative Space: As used in this disclosure, negative space is a method of defining an object through the use of open or empty space as the definition of the object itself, or, through the use of open or empty space to describe the boundaries of an object.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Outer Dimension: As used in this disclosure, the term outer dimension describes the span from a first exterior or outer surface of a tube or container to a second exterior or outer surface of a tube or container. The term is used in much the same way that a plumber would refer to the outer diameter of a pipe.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan are open.

Patient: As used in this disclosure, a patient is a person who is designated to receive a medical treatment, therapy, or service. The term patient may be extended to an animal when used within the context of the animal receiving veterinary treatment or services.

Pedestal: As used in this disclosure, a pedestal is an intermediary load bearing structure that forms a load path between two objects or structures.

Perimeter: As used in this disclosure, a perimeter is one or more curved or straight lines that bounds an enclosed area on a plane or surface. The perimeter of a circle is commonly referred to as a circumference.

Perimetrical Boundary: As used in this disclosure, a perimetrical boundary is a hypothetical rectangular block that contains an object. Specifically, the rectangular block selected to be the perimetrical boundary is the rectangular block with the minimum volume that fully contains the object. In a two-dimensional structure, the perimetrical boundary is the rectangle with the minimum surface area.

Pivot: As used in this disclosure, a pivot is a rod or shaft around which an object rotates or swings.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Protection Space: As used in this disclosure, a protection space is a space formed by a boundary structure. The boundary structure forms a protective barrier that protects objects outside the protection space from potential dangers from the operation of a device or process contained within the protection space.

Relaxed Shape: As used in this disclosure, a structure is considered to be in its relaxed state when no shear, strain, or torsional forces are being applied to the structure.

Rotation: As used in this disclosure, rotation refers to the cyclic movement of an object around a fixed point or fixed axis. The verb of rotation is to rotate.

Spring: As used in this disclosure, a spring is a device that is used to store mechanical energy. This mechanical energy will often be stored by: 1) deforming an elastomeric material that is used to make the device; 2) the application of a torque to a semi-rigid structure; or 3) a combination of the previous two items.

Stop-Motion: As used in this disclosure, a stop-motion is a second device that limit the range of a first object. The range of the first object is selected from the group consisting of a range of motion or a range of rotation.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load of the object is transferred. This disclosure assumes that an object placed on the supporting surface is in an orientation that is appropriate for the normal or anticipated use of the object.

Telescopic: As used in this disclosure, telescopic is an adjective that describes a composite prism structure made of hollow prism-shaped sections that fit or slide into each other such that the composite prism structure can be made longer or shorter by adjusting the relative positions of the hollow prism-shaped sections.

U-Shaped Structure: As used in this disclosure, a U-shaped structure is a type of offset composite prism structure. The U-shaped structure is a three sided structure comprising a crossbeam, a first arm, and a second arm. In a U-shaped structure, the first arm and the second arm project away from the crossbeam: 1) in the same direction; 2) at a roughly perpendicular angle to the crossbeam, and, 3) the span of length of the first arm roughly equals the span of length of the second arm. An illiterate U-shaped structure refers to a U-shaped structure wherein the span of the length of the first arm differs from the span of the length of the second arm by more than 10 percent. A guided U-shaped structure refers to a U-shaped structure that has: a) the first arc formed by the interior cant formed between the first arm and the crossbeam is greater than or equal to 100 degrees; b) a second arc formed by the interior cant formed between the second arm and the crossbeam is greater than or equal to 100 degrees; and, c) the first arc and the second arc are roughly equal.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification.

Unless specifically noted in this disclosure, the vertical direction is always perpendicular to the horizontal direction.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. An extendable safety handle for benches comprising a pedestal structure and a telescopic stanchion;

wherein the pedestal structure attaches the telescopic stanchion to a bench;

wherein the pedestal structure comprises a u-shaped structure, a locking stop, a compression spring, and a locking hinge;

wherein the u-shaped structure forms a protection space that encloses the locking stop, the compression spring, and the locking hinge.

2. The extendable safety handle for benches according to claim 1 wherein the extendable safety handle for benches is a safety device;

wherein the extendable safety handle for benches is a mobility assistance device;

wherein the extendable safety handle for benches is configured to be attached to said bench;

wherein the extendable safety handle for benches rotates between a collapsed position and a deployed position.

3. The extendable safety handle for benches according to claim 2 wherein the telescopic stanchion rotates relative to the pedestal structure;

wherein the telescopic stanchion rotates between the deployed position and the collapsed position.

4. The extendable safety handle for benches according to claim 3 wherein the pedestal structure forms the load path that transfers the loads borne by the telescopic stanchion to the bench.

5. The extendable safety handle for benches according to claim 4 wherein the telescopic stanchion is a load bearing structure;

wherein the telescopic stanchion attaches to the pedestal structure;

wherein the telescopic stanchion attaches to the pedestal structure such that the telescopic stanchion rotates relative to the pedestal structure;

wherein the telescopic stanchion rotates between the collapsed position and the deployed position.

6. The extendable safety handle for benches according to claim 5 wherein the pedestal structure releasably locks the telescopic stanchion in the collapsed position;

wherein the pedestal structure releasably locks the telescopic stanchion into the deployed position.

7. The extendable safety handle for benches according to claim 6 wherein the telescopic stanchion forms a composite structure;

wherein the span of the length of the center axis of the composite structure of the telescopic stanchion is adjustable;

wherein the telescopic stanchion is a telescopic structure.

8. The extendable safety handle for benches according to claim 7 wherein the telescopic stanchion a first arm, a second arm, a detent, and a bushing;

wherein the detent is a mechanical device that locks and secures the first arm to the second arm;

wherein the bushing is a mechanical structure that secures the compression spring within the protection space formed by the u-shaped structure.

9. The extendable safety handle for benches according to claim 8 wherein the u-shaped structure is a mechanical structure;

wherein the u-shaped structure is a rigid structure;

wherein the u-shaped structure attaches to the bench;

wherein the u-shaped structure forms a final link in the load path that transfers the load borne by the extendable safety handle for benches to the bench.

10. The extendable safety handle for benches according to claim 9 wherein the telescopic stanchion attaches to the u-shaped structure within the protection space formed by the pedestal structure.

11. The extendable safety handle for benches according to claim 10 wherein the locking hinge is a fastening device;

wherein the locking hinge is a rotating structure;

wherein the locking hinge attaches the telescopic stanchion to the u-shaped structure;

wherein the locking hinge attaches the telescopic stanchion to the u-shaped structure such that the telescopic stanchion rotates between the collapsed position and the deployed position.

12. The extendable safety handle for benches according to claim 11 wherein the locking stop is a stop motion;

wherein the locking stop limits the rotation of the telescopic stanchion such that the telescopic stanchion will not rotate outside of an arc bounded by the collapsed position and the deployed position;

wherein the locking stop forms a mechanical structure that holds the telescopic stanchion in a set position when the telescopic stanchion rotates into the collapsed position;

wherein the locking stop forms a mechanical structure that holds the telescopic stanchion in a set position when the telescopic stanchion rotates into the deployed position.

13. The extendable safety handle for benches according to claim 12 wherein the compression spring mounts in the u-shaped structure such that the compression spring is deformed when the telescopic stanchion rotates into the collapsed position;

wherein the compression spring mounts in the u-shaped structure such that the compression spring is deformed when the telescopic stanchion rotates into the deployed position.

14. The extendable safety handle for benches according to claim 13 wherein the locking hinge is a locking structure;

wherein the locking hinge releasably locks the telescopic stanchion in the collapsed position;

wherein the locking hinge releasably locks the telescopic stanchion in the deployed position.

15. The extendable safety handle for benches according to claim 14 wherein the first arm is a hollow that is further defined with an inner dimension;

wherein the second arm is a hollow that is further defined with an outer dimension;

wherein the second arm is geometrically similar to the first arm;

wherein the span of the outer dimension of the second arm is lesser than the span of the inner dimension of the first arm such that the second arm inserts into the first arm in a telescopic fashion to form a composite structure.

* * * * *